US011204717B2

(12) United States Patent
Cheru et al.

(10) Patent No.: US 11,204,717 B2
(45) Date of Patent: Dec. 21, 2021

(54) OBJECT STORAGE SYSTEM WITH ACCESS CONTROL QUOTA STATUS CHECK

(71) Applicant: Western Digital Technologies, Inc., San Jose, CA (US)

(72) Inventors: Tomy Ammuthan Cheru, Thrissur (IN); Carl D'Halluin, Ghent (BE); Souvik Kumar Roy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 121 days.

(21) Appl. No.: 16/441,573

(22) Filed: Jun. 14, 2019

(65) Prior Publication Data
US 2020/0159452 A1     May 21, 2020

(30) Foreign Application Priority Data
Nov. 15, 2018   (IN) .............................. 201841043066

(51) Int. Cl.
*G06F 3/06*     (2006.01)
(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | |
|---|---|---|
| 2002/0129346 A1 | 9/2002 | Lee et al. |
| 2011/0191485 A1 | 8/2011 | Umbehocker |
| 2015/0234879 A1* | 8/2015 | Baldwin ............. G06F 16/1727 707/694 |
| 2017/0220500 A1 | 8/2017 | Tong |
| 2017/0364280 A1 | 12/2017 | Kim |
| 2019/0228080 A1 | 7/2019 | Abe et al. |

* cited by examiner

*Primary Examiner* — Farley Abad
*Assistant Examiner* — Dayton Lewis-Taylor
(74) *Attorney, Agent, or Firm* — Patent Law Works LLP

(57) ABSTRACT

Example object storage systems, bookkeeping engines, and methods provide quota-based access control for control entities, such as accounts, users, and buckets. An object data store is configured to enable control entities to access data objects associated with each control entity. Quota thresholds and usage values are determined for control entities and used to determine a quota status. Quota status is used to determine data object access response based on the requesting control entities.

20 Claims, 8 Drawing Sheets

OBJECT STORAGE SYSTEM WITH ACCESS CONTROL QUOTA STATUS CHECK

TECHNICAL FIELD

The present disclosure generally relates to data storage, and in a more particular example, to distributed object storage systems with quota bookkeeping for multiple control entities.

BACKGROUND

Often, distributed object storage systems are used to store large amounts (e.g., terabytes, petabytes, exabytes, etc.) of data, such as objects in a distributed and fault tolerant manner with a predetermined level of redundancy. These distributed object storage systems may be maintained by service providers supporting multiple control entities, such as enterprise accounts, account users, and data buckets or other logical groupings of data access privileges.

Object storage systems may store data in data objects. Data objects may be stored in data buckets or similar logical partitions that provide a level of access control. For example, an account and user may be required to have a set of credentials associated with a given bucket to be able to access data objects stored within. In general, buckets are associated with enterprise accounts that reflect ownership of the data contained within the bucket. In some contexts, a distributed object storage system may include multiple enterprise accounts storing data objects on the same storage system hardware. Multiple users may be associated with enterprise accounts and limit access to particular buckets within the set of buckets associated with an enterprise account. Each user may have access to a particular bucket or set of buckets. In some context, super-user accounts may be associated with buckets across enterprise accounts. Similarly, some distributed storage systems may include permissions or other credentials that can enable an account or user to access buckets owned by other accounts or users.

Within distributed object storage systems with multiple control entities, it may be desirable to allocate and track storage used by different control entities. In some contexts, allocation and tracking of storage used may contribute to the calculation of payment for storage services (e.g. metering and billing) and/or management of storage allocation to different companies, departments, projects, users, or other logical units of resource management. Tracking of these storage allocations may be referred to as bookkeeping.

Within this context, it may be advantageous to place limits or quotas on the amount of storage resources that may be used by any given control entity, such as accounts, users, and buckets. These quotas may be based on various storage parameters, such as storage capacity (e.g. bytes or blocks used), number of objects, and/or number of transactions (e.g. read operations, write operations, etc.).

Within distributed object storage systems, a need may exist for bookkeeping systems and methods that provide data access control based on predefined quotas concurrently for a plurality of control entities and/or control entity types (e.g. accounts, users, buckets, etc.), while managing read/write overhead.

SUMMARY

Various aspects for quota enforcement, particularly, object storage systems and methods with control entity quota status checking during access control are described.

One general aspect includes a system that includes an object data store configured to enable a plurality of control entities to access a plurality of data objects associated with at least one control entity of the plurality of control entities. A bookkeeping engine is configured to: determine at least one quota threshold associated with each control entity of the plurality of control entities; determine at least one object usage value for each control entity of the plurality of control entities; and determine, based on the at least one object usage value exceeding the at least one quota threshold associated with each control entity of the plurality of control entities, a quota status for each of the plurality of control entities. An access control engine is configured to determine, based on the quota status associated with at least one requesting control entity from the plurality of control entities, a data object access response for a target data object.

Implementations may include one or more of the following features. The plurality of control entities may include control entities selected from data object buckets, user profiles, and object data store accounts. The at least one quota threshold associated with the at least one requesting control entity may include a plurality of quota thresholds, the at least one object usage value may include a plurality of object usage values corresponding to the plurality of quota thresholds, and the bookkeeping engine may be further configured to: execute determining the at least one quota threshold for each quota threshold of the plurality of quota thresholds; execute determining the at least one object usage value for each object usage value of the plurality of object usage values; and execute determining the quota status for each of the plurality of control entities includes comparing each object usage value of the plurality of object usage values corresponding to the plurality of quota thresholds to each quota threshold of the plurality of quota thresholds for each of the plurality of control entities. Each quota status may be a composite quota status for each of the plurality of quota thresholds for a requesting control entity. The at least one quota threshold associated with the at least one requesting control entity may be selected from a number of data objects, a storage capacity, or a transactional threshold. The at least one object usage value may be selected from a corresponding number of data objects value, storage capacity value, or transactional value. The bookkeeping engine may be further configured to determine the quota status for each of the plurality of control entities asynchronously from write requests to the object data store. The access control engine may be further configured to respond to each write request to the object data store. The bookkeeping engine may be further configured to store the quota status for each of the plurality of control entities in a metadata store indexed by the plurality of control entities. The access control engine may be further configured to read the quota status for each of the plurality of control entities from the metadata store indexed by the plurality of control entities. The access control engine may be further configured to determine, based on an access credential associated with at least one requesting control entity from the plurality of control entities, the data object access response for the target data object, the access credential being different than the quota status. The at least one requesting control entity may include a plurality of requesting control entities associated with a write request to the object data store. The access control engine may be further configured to execute, for each requesting control entity of the plurality of requesting control entities: determining, based on the quota status, the data object access response; and determining, based on the access credential, the data object access response.

Another general aspect includes a computer-implemented method, including: receiving a data object access request associated with a requesting control entity, where the requesting control entity is configured to access data objects associated with the requesting control entity; determining at least one quota threshold associated with the requesting control entity; determining at least one object usage value corresponding to the at least one quota threshold; and determining, based on the at least one object usage value exceeding the at least one quota threshold associated with the requesting control entity, a quota status for the requesting control entity; and determining, based on the quota status associated with the requesting control entity, a data object access response for a target data object.

Implementations may include one or more of the following features. The data objects may be stored in an object data store, the requesting control entity may be a control entity from a plurality of control entities associated with the object data store, and the plurality of control entities may each be associated with at least one data object in the object data store. The plurality of control entities may include control entities selected from data object buckets, user profiles, and object data store accounts. The at least one quota threshold associated with the requesting control entity may include a plurality of quota thresholds. The at least one object usage value may include a plurality of object usage values corresponding to the plurality of quota thresholds. Determining the at least one quota threshold may be executed for each quota threshold of the plurality of quota thresholds. Determining the at least one object usage value may be executed for each object usage value of the plurality of object usage values. Determining the quota status for the requesting control entities may include comparing each object usage value of the plurality of object usage values corresponding to the plurality of quota thresholds to each quota threshold of the plurality of quota thresholds for the requesting control entities. Each quota status may be a composite quota status for each of the plurality of quota thresholds for the requesting control entity. Determining the at least one object usage value may be executed asynchronously from write requests to the object data store. Determining the data object access response for the target data object may be responsive to a write request for the target data object. The computer-implemented method may further include: storing the quota status for each of the plurality of control entities in a metadata store indexed by the plurality of control entities; and reading the quota status for each of the plurality of control entities from the metadata store indexed by the plurality of control entities. The computer-implemented method may further include determining, based on an access credential associated with the requesting control entity, the data object access response for the target data object, where the access credential is different than the quota status. A plurality of requesting control entities may be associated with a write request to the object data store for the target data object and the access control engine may be further configured to execute, for each requesting control entity of the plurality of requesting control entities: determining, based on the quota status, the data object access response; and determining, based on the access credential, the data object access response.

Another general aspect includes a system that includes an object data store configured to enable a requesting control entity to access data objects associated with the requesting control entity. Means are provided for determining at least one quota threshold associated with the requesting control entity. Means are provided for determining at least one object usage value corresponding to the at least one quota threshold. Means are provided for determining, based on the at least one object usage value exceeding the at least one quota threshold associated with the requesting control entity, a quota status for the requesting control entity. Means are provided for determining, based on the quota status associated with the requesting control entity, a data object access response for a target data object.

Implementations may include one or more of the following features. The means for determining the at least one object usage value may be configured to execute asynchronously from write requests to the object data store and the means for determining the data object access response for the target data object may be responsive to a write request for the target data object. The various embodiments advantageously apply the teachings of distributed object storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve data object access control for enforcing quota limits, such as by checking quota status for various control entities associated with object data access requests. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
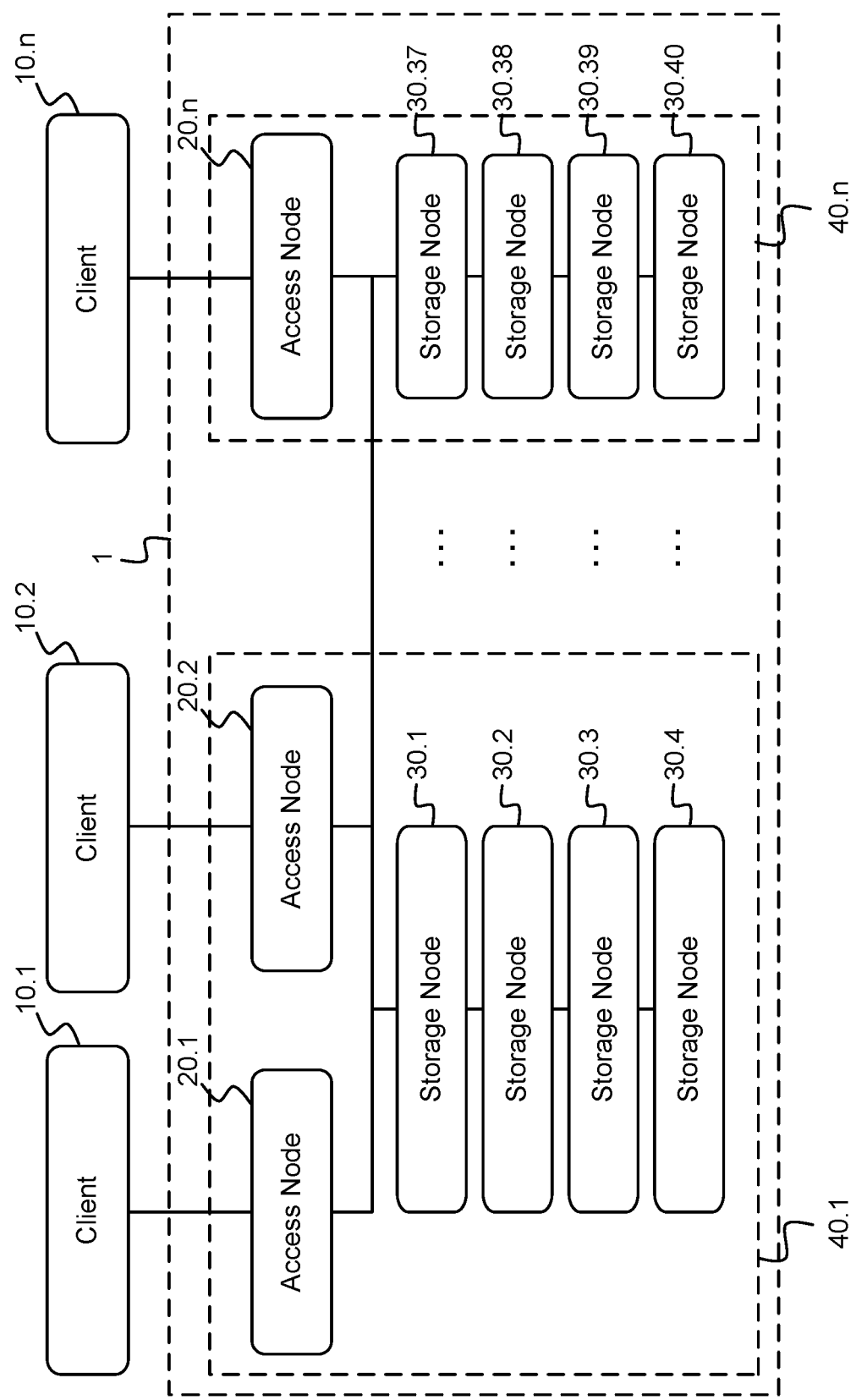
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network.

Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through REST application programming interfaces (APIs). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
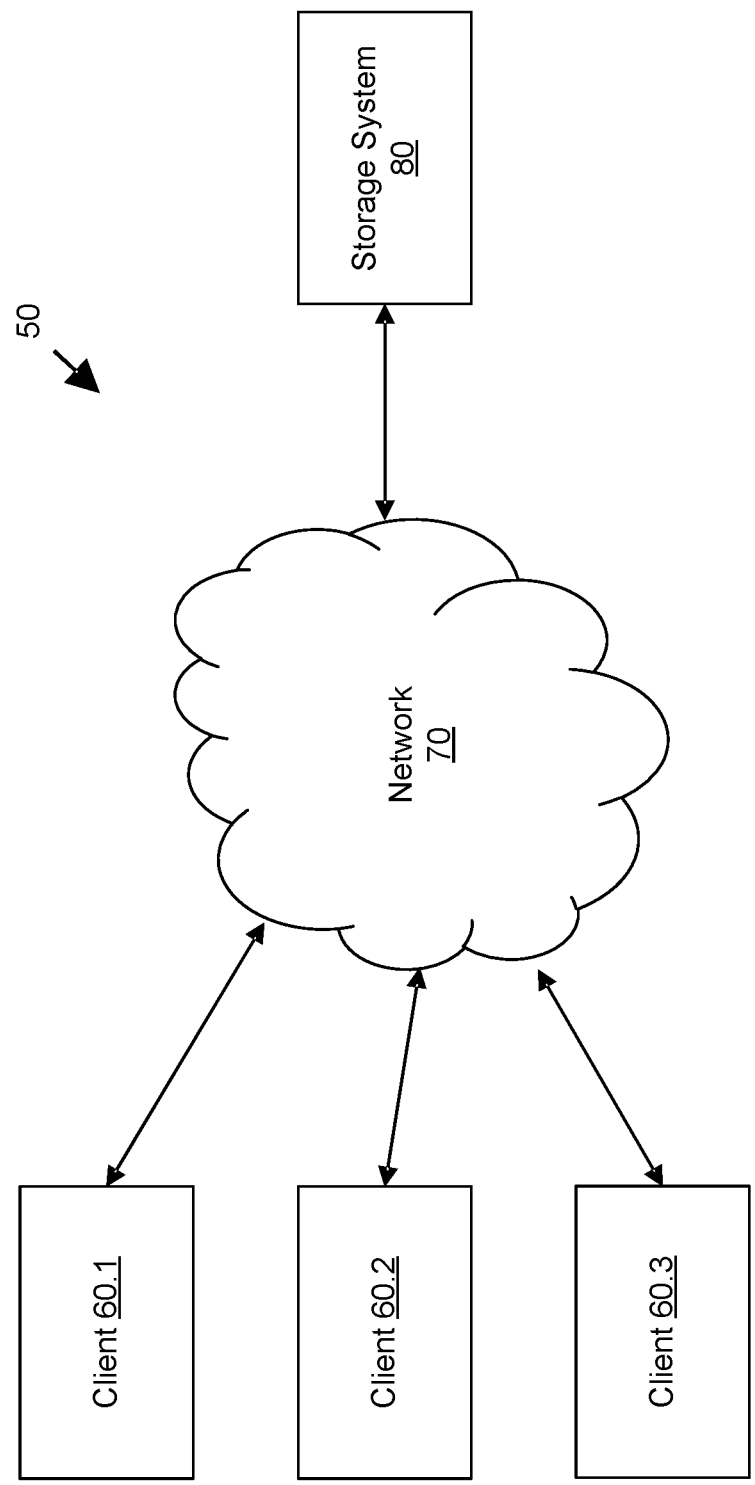
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
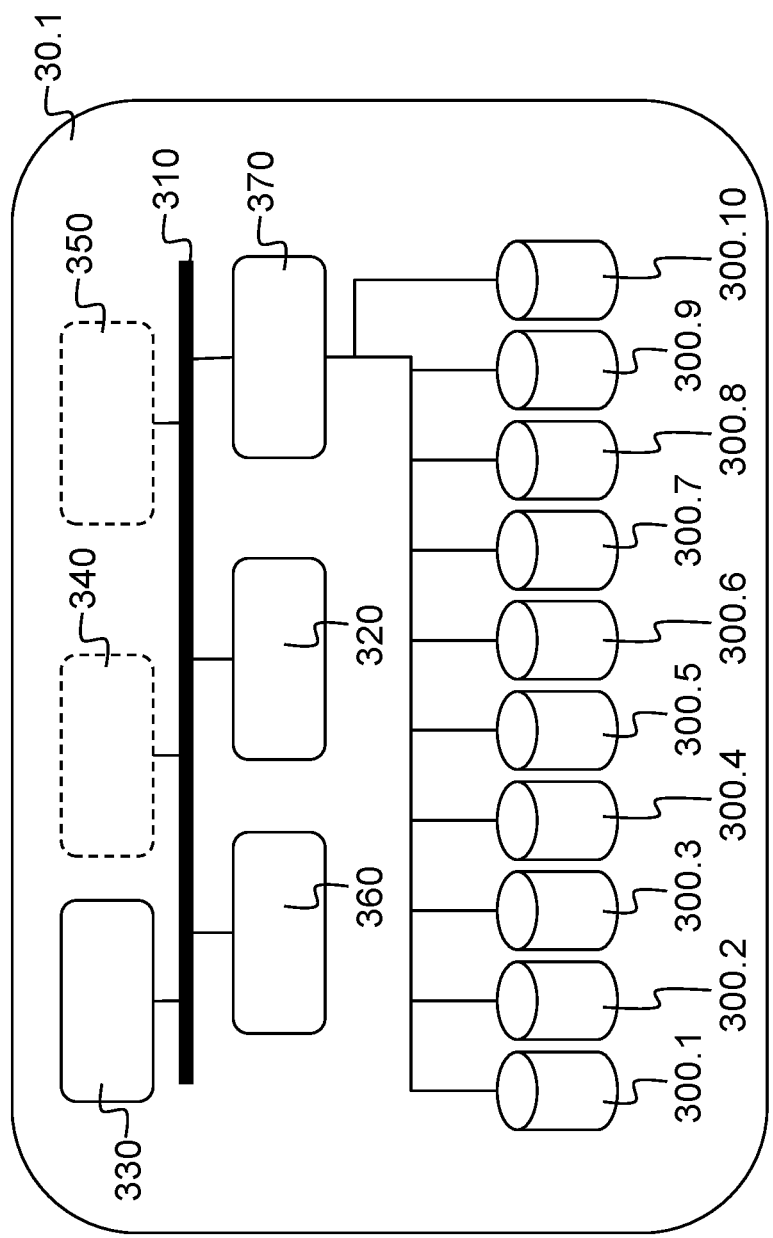
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
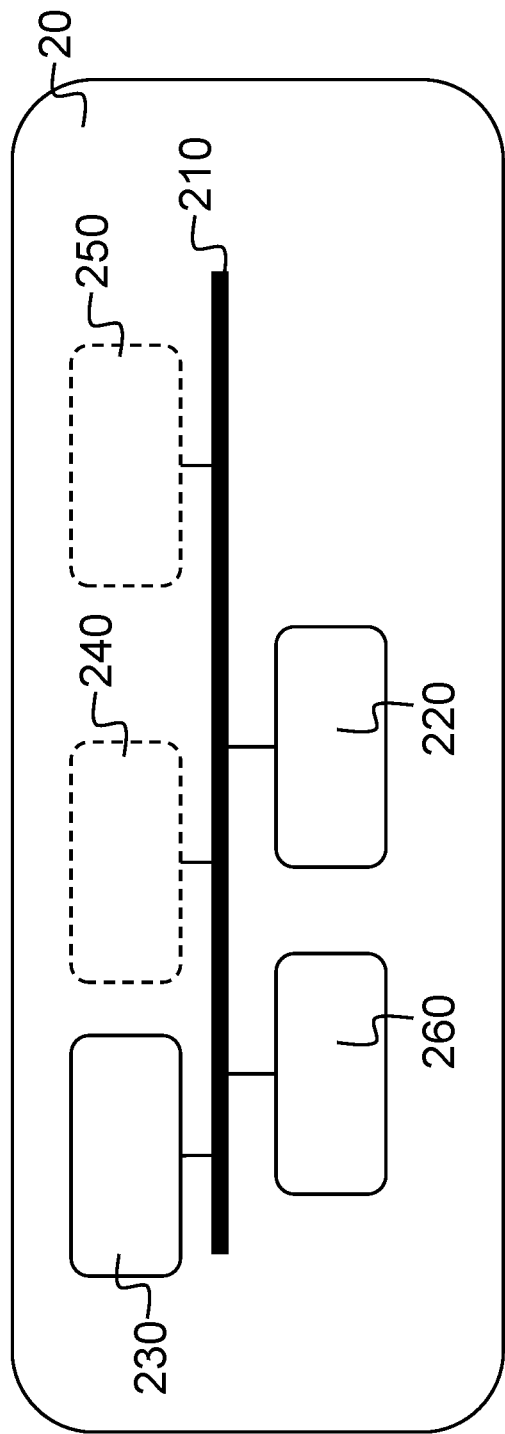
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, and one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 220 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
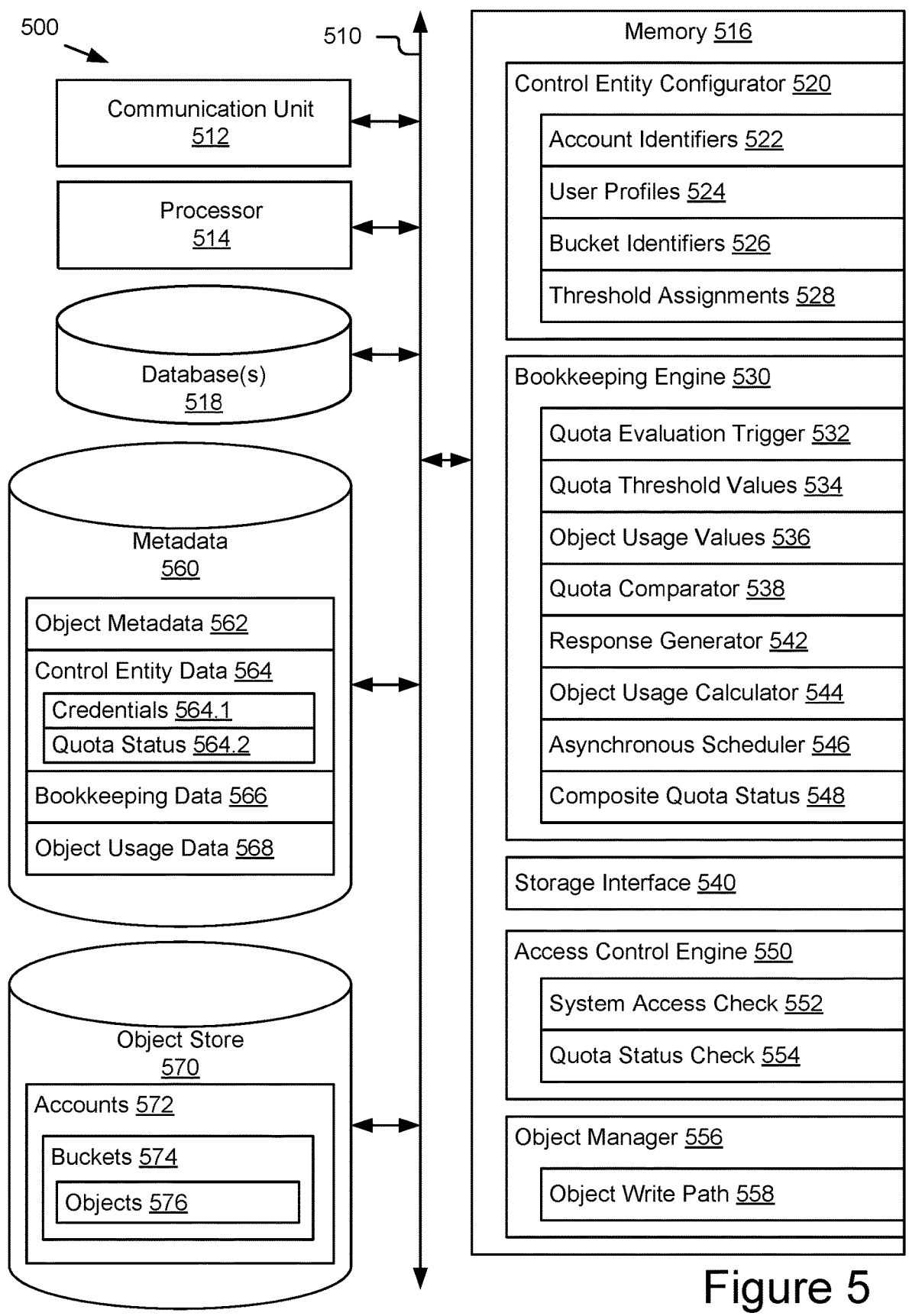
FIG. 5 schematically illustrates some example elements of an object storage system for the distributed storage system of FIG. 1.

FIG. 5 schematically shows selected modules of an access node or controller node with a bookkeeping engine for control entity quota enforcement and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 560 and object store 570. Databases may include one or more data structures for storing, retrieving, indexing, searching, filtering, etc. of structured and/or unstructured data elements. In some embodiments, metadata store 560 may be structured as reference data entries and/or data fields indexed by metadata key value entries related to data objects stores in object store 570. Object store 570 may include data objects comprised of object data (such as host data), some amount of metadata (stored as metadata tags), and a GUID. Metadata store 560, object store 570, and/or other databases or data structures may be maintained and managed in separate computing systems, such as storage nodes, with separate communication, processor, memory, and other computing resources and accessed by object storage system 500 through data access protocols. Metadata store 560 and object store 570 may be shared across multiple object storage systems 500.

Object storage system 500 may include a plurality of modules or subsystems that are stored and/or instantiated in memory 516 for execution by processor 514. For example, memory 516 may include a control entity configurator 520 for receiving, generating, and/or storing control entity configurations for accessing object store 570. Memory 516 may include a bookkeeping engine 530 for calculating and tracking control entity metering and billing, including the management of control entity quotas. Memory 516 may include an access control engine 550 for controlling access to object storage operations, including execution of a quota status check.

Memory 516 may also include other modules, functions, methods, or operations related to object storage that may be configured to support control entity configurator 520, bookkeeping engine 530, and/or access control engine 550. In some embodiments, these functions may be defined as part of general object storage, data object access, or similar storage management operations. In the example shown, storage interface 540 and object manager 556 may call and/or be called by other modules, such as control entity configurator 520, bookkeeping engine 530, and/or access control engine 550 and/or available to other clients, libraries, systems, or users through one or more APIs. In some embodiments, control entity configurator 520, bookkeeping engine 530, and/or access control engine 550 may be integrated into storage interface 540 and/or object manager 556, or they may be managed as separate libraries or background processes (e.g. daemon) through an API or other interface.

Control entity configurator 520 may include interfaces, functions, and/or data structures for configuring control entities with access privileges or associations with data objects in object store 570. For example, control entity configurator 520 may include one or more user interfaces for setting up and modifying enterprise accounts, users, buckets, and other control entities. In some embodiments, control entity configurator may include or access one or more tables or other data structures for mapping, storing, and/or managing account identifiers 522, user profiles 524, and bucket identifiers 526 for the different control entity types (accounts, users, and buckets) in object storage system 500. For example, metadata 560 may include control entity data 564 for storing control entity configuration information or data structures.

Control entity identifiers may be associated with access rights to data objects in object store 570 such that each data object may only be accessed through associated account identifiers 522, user profiles 524, and bucket identifiers 526. For example, each object data access request and/or associated metadata or session information may include the account identifier, user profile, and bucket identifier for the requesting user (and associated requesting account) and target data object. In some embodiments, account identifiers 522, user profiles 524, and/or bucket identifiers 526 may be associated with credentials that are validated by storage interface 540 before allowing access to the target data object.

Account identifiers 522 may include account information for a storage service. Account identifiers 522 may be associated with one or more users for accessing data objects and one or more buckets for containing or organizing data objects. In some embodiments, account identifiers 522 may include an account number, account name, account type, and other information uniquely describing a particular account.

User profiles 524 may include user information, including one or more user identifiers for uniquely identifying a specific user. User profiles 524 may be associated with one or more accounts with ownership of data objects and one or more buckets for containing or organizing data objects. In some embodiments, user profiles 524 may include user name, login credentials, user type, and other information uniquely describing a particular user.

Bucket identifiers 526 may include bucket information, including a unique bucket identifier value for uniquely identifying a specific data bucket. Bucket identifiers may be associated with one or more accounts with ownership of data objects and one or more users with access privileges to the data bucket. In some embodiments, bucket identifiers 526 may be include in each object data access request, along with a globally unique identifier (GUID) for the target data object in a selected bucket. In some configurations, other logical groupings of data objects may be used as control entities for accessing data objects, such as data groups, partitions, hierarchies, etc.

Control entity configurator 520 may include quota assignments 528 for one or more of the configured control entities. For example, storage usage quotas may be associated account identifiers 522, user profiles 524, and bucket identifiers 526 such that each control entity is only allowed to use its allotted quota of storage. Quota assignments 528 may include a maximum usage value for an aggregate object usage value for all objects associated with that control entity. For example, a maximum storage capacity usage quota value may be set of an account identifier that means the aggregate storage capacity usage of all data objects associated with that account may not exceed the quota value. A storage capacity usage quota value for a user profile may mean the aggregate storage capacity used by all objects associated with that user may not exceed the quota value. A storage capacity usage quota value for a bucket identifier may mean the aggregate storage capacity used by all object in that bucket may not exceed the quota value.

In some embodiments, quota values may be assigned for one or more control entities based on multiple object usage parameters. For example, quota assignments 528 for each account may include a storage capacity quota, a number of objects quota, a number of operations quota, and/or other object usage quotas. Similar quota assignments 528 may be configured for users and buckets. Each of these quotas may be represented by a different quota value corresponding to the relevant object storage parameter. Note that not all control entity types may be limited by the same object usage parameters. For example, accounts may have a storage capacity quota, while users have a number of operations quota and buckets have a number of objects quota.

In some embodiments, quota values may be assigned for one or more control entities based on multiple response levels. For example, quota assignments 528 for each control entity and usage quota type may include a hard limit and a soft limit. For example, a hard limit may define a quota value that if exceeded will cause access to data objects to be denied and an error message to be sent. Note that the hard limit may still allow some data access operations, such as read or delete operations, but require remediation (such as through delete operations) before allowing new write operations. A soft limit may define a quota value that if exceeded will cause a warning to be issued to notify the user, account manager, or other system administrator that the soft limit has been exceeded and there is a danger of reaching the hard limit.

In some embodiments, each response level quota value may be set independently. In some embodiments, each response level quota value may be derived from another response level. For example, the warning or soft quota threshold may be a percentage of the access denial or hard quota threshold, such as 80%.

Additional response levels are also possible. For example, there could be a notification response level at 50% of the hard limit, a warning response level at 80% of the hard limit, the write access denial at 100% of the hard limit, and storage access denial (effectively freezing the relevant control entities) at 120% (perhaps requiring administrative action to remedy). Note that it may be possible in some embodiments to achieve greater that 100% object usage values due to a particularly large object and/or lag in updating usage values. In some embodiments, response levels may also be responsive to multiple quotas being exceeded, which may increase the severity of the response. For example, if both number of objects and capacity are simultaneously exceeded, a higher response level may be generated by bookkeeping engine 530.

Bookkeeping engine 530 may include interfaces, functions, and/or data structures for managing accountability of usage of the data objects in object store 570, including enforcement of quotas set in control entity configurator 520.

In some embodiments, bookkeeping engine 530 tracks one or more usage parameters and associated usage values for metering and billing purposes. For examples, accounts may have associated storage service terms that may include parameter-based limits on the account and/or payment tiers based on usage parameters. In some embodiments, quota assignments 528 may be derived from the storage service terms as a means of managing storage usage and prevent overages that could exceed the budget of the data owner or the allocated capacity of the storage service. Bookkeeping engine 530 may include account owner, user, and/or system administrator interfaces and related functional modules (not shown) that enable metering and billing for accounts. In some embodiments, bookkeeping engine 530 may store data related to various bookkeeping functions in bookkeeping data 566 in metadata store 560.

Bookkeeping engine 530 may be configured for enforcement of quota assignments 528 and may include one or more hardware or software functions for monitoring usage, comparing usage to quotas, and generating responses, including denial of data object access and warnings or other notifications. In some embodiments, bookkeeping engine 530 may include and/or interface with an object usage calculator configured to support quota checking. In some embodiments, bookkeeping engine 530 may include quota evaluation trigger 532, quota threshold values 534, object usage values 536, quota comparator 538, response generator 542, usage calculator 544, asynchronous scheduler 546, and composite quota status 548.

Quota evaluation trigger 532 may include interfaces, functions, and/or parameters for initiating an evaluation of whether one or more quota thresholds have been exceeded. For example, bookkeeping engine 530 may be configured to check quota thresholds periodically (based on elapsed time or number of storage operations), responsive to storage operations, object data access request, write operation, etc. or based on other trigger conditions (available bandwidth, completion of garbage collection, completion of an iteration of object usage calculation, etc.). In some embodiments, quota evaluation trigger 532 may be configured as a rule set including parameters for managing one or more trigger conditions. For example, a quota evaluation parameter may define the time between quota evaluations. In some embodiments, asynchronous scheduler 546 may receive parameters for initiating quota evaluation trigger 532, such as scheduling periodic calculation of usage and quota comparisons to determine quota status for each control entity.

Quota threshold values 534 may include interfaces, functions, and/or parameters for accessing and/or storing quota threshold values for each quota being monitored by bookkeeping engine 530. For example, quota assignments 528 may generate, receive, and/or store quota threshold values in bookkeeping data 566 for retrieval by bookkeeping engine 530 when evaluating quota status. In some embodiments, an array of values corresponding to various control entities, object storage parameters, and response levels may be maintained for all control entities with access to object store 570. For example, quota threshold values table may be maintained with a column of unique identifiers for the various control entities and additional columns for the various threshold values associated with each control entity.

Object usage values 536 may include interfaces, functions, and/or parameters for accessing and/or storing object usage values for each quota being monitored by bookkeeping engine 530. For example, an object usage calculator may generate, receive, and/or store object usage values in object usage data 568 for retrieval by bookkeeping engine 530 when evaluating quota status. In some embodiments, usage calculator 544 may generate total usage values for each control entity and provide those values to object usage values 536. In some embodiments, an array of values corresponding to various control entities and object storage parameters may be maintained for all control entities with access to object store 570. For example, an object usage values table may be maintained with a column of unique identifiers for the various control entities and additional columns for the various threshold values associated with each control entity. In some embodiments, object usage values 536 may be generated responsive to each quota evaluation trigger by a query or request to an object usage calculator or the corresponding functions within bookkeeping engine 530, which may calculate and return the requested object usage value(s).

Object usage values 536 may correspond to quota threshold values 534 directly or through some type of transfer function. For example, a number of data objects (count) threshold value may correspond to a number of data object value calculated from the object store 570, a storage capacity (size) threshold may correspond to a storage capacity value calculated from the object store 570, or a transactional threshold value (operations) may correspond to a transactional value calculated from the object store 570.

Quota comparator 538 may provide threshold status evaluations for a plurality of quotas and corresponding usage values, including status checks for different response levels. Quota comparator 538 may include interfaces, functions, and/or parameters for comparing quota threshold values 534 to object usage values 536 for each quota being monitored by bookkeeping engine 530. For example, quota comparator 538 may receive quota threshold values and the corresponding object usage values for a requesting control entity. Quota comparator 538 may include one or more comparator functions to determine whether the object usage value exceeds the quota threshold value and return a status indicator, such as a flag value, for whether the comparator function was false (not exceeded) or true (exceeded). In some embodiments, quota comparator 538 may use the same comparator function with different threshold values or may be a single function that includes multiple threshold values for a plurality of different response levels. For example, the comparator function may use a single hard threshold value to determine a soft threshold value and return a hard positive, soft positive, or negative status indicator. As discussed elsewhere, additional response levels and thresholds may be handled by bookkeeping engine 530 and one or more comparators.

In some embodiments, quota comparator 538 may generate quota status indicators that cause another component to complete a response action, such response generator 542 sending a warning message to a user and/or access control engine 550 denying write access and sending an error message responsive to the storage access request. In some embodiments, quota comparator 538 may trigger response generator 542 to generate an automated system response, such as through bookkeeping engine 530, storage interface 540, and/or object manager 556. For example, bookkeeping engine 530 may include logic for automatically reallocating quota assignments responsive to a quota being exceeded, such as moving an account, user, or bucket to another usage or billing tier, and/or prompting a user to do so.

Response generator 542 may include interfaces, functions, and/or parameters for responding to one or more exceeded quotas detected by bookkeeping engine 530. For example, in response to a soft limit being exceeded, response generator 542 may send a warning message to a user associated with one or more impacted control entities. The warning message may include an identification of what thresholds have been exceeded and recommend remedial actions. In some embodiments, response generator 542 may include a flag or other indicator value that is available in a data structure or message to other functions, systems, or users for communicating quota status and/or initiating additional automated responses. For example, quota status values 564.2 may be stored in control entity data 564, such that control entity identifiers may be directly associated with their quota status and accessed by other components, such as access control engine 550.

In some embodiments, response generator 542 may operate in conjunction with access control engine 550 to limit storage operations available to the control entity. For example, response generator 542 may provide a quota status indicator value to access control engine 550 to reject specified storage operations, such as write operations, or reject storage access requests and provide a corresponding error message for specified control entities. In some embodiments, response generator 542 may be configured by a system administrator to map specific quota status to specific system responses (and the subsystems and interfaces responsible for implementing those responses).

Object usage calculator 544 may include interfaces, functions, and/or parameters for retrieving and/or calculating object usage data from metadata 560 and/or object store 570. For example, object usage calculator 544 may calculate storage capacity, object count, data operations, and/or other usage parameters for data objects in object store 570. In some embodiments, object usage calculator 544 may parse data object entries in metadata store 560 that include data object and/or data operation parameters to generate cumulative object usage values and store them in object usage data 568. For example, object usage calculator 544 may periodically extract storage parameters from one or more logs in metadata 560 to calculate object usage values for data objects. In some embodiments, object usage calculator 544 may manage running usage values for data objects in object usage data 568 and update them responsive to each write, delete, garbage collection, or other operation impacting the usage value. For example, asynchronous scheduler 546 may be used to schedule periodic calculation or update of object usage values.

Object usage calculator 544 may send or otherwise make available object usage values for use by other clients, libraries, systems, or users through one or more APIs. For example, object usage values 536 in bookkeeping engine 530 may be generated and/or published by object usage calculator 544. In some embodiments, object usage calculator 544 stores object usage values as object usage data 568 in metadata 560 and bookkeeping engine 530 may query metadata 560 for the determination of object usage values 536.

In some embodiments, object usage calculator 544 may include functions for traversing or querying object metadata 562 to extract object size, object count, object type, and other metadata fields or parameters that could be relevant to quota calculations. A metadata processor may be configured to extract data from one or more metadata logs, such as transactional logs or parameter logs. In some embodiments, object usage calculator 544 traverses metadata information related to data objects in object store 570 and populates parameter data for each object in corresponding entries associated with each control entity for each object. For example, for each object, a plurality of control entities may be identified, such as an associated bucket, user, and account, and usage parameter values, such as count and size, for the object may be placed in an object-entity map data structure. This data structure may be large, including usage value entries for each combination of control entity and parameter for every data object being analyzed.

In some embodiments, object usage calculator 544 may query or traverse the object-entity map populated with per object usage data and generate a total object usage value for each control entity and parameter or usage value type. In some embodiments, object usage calculator 544 may generate a reduced representation of the object-entity map that includes one total usage value per usage value type and control entity combination. For example, a resulting control entity table may contain each control entity identifier and each corresponding total usage value, without reference to individual data objects.

Asynchronous scheduler 546 may include interfaces, functions, and/or data structures for operating object usage calculator 544 and/or quota evaluation trigger 532 independent of access control engine and resulting quota status checks 554. For example, asynchronous scheduler 546 may define a schedule for calculating and returning total usage values for each control entity (using object usage calculator 544) and/or updating quota status by comparing object usage values 536 and quota threshold values 534 (using quota comparator 538). In some embodiments, asynchronous scheduler 546 manages scheduling of iterative updates of object usage data 568 and/or quota status 564.2. For example, an iteration may include traversing the metadata for all objects in object store 570 or a relevant subset thereof to determine or update usage values from relevant parameters and subsequently determine of quota status. Asynchronous scheduler 546 may run the iterative usage value updates and/or quota status updates as one or more background tasks.

In some embodiments, asynchronous scheduler 546 may include a delay configuration. For example, the delay configuration may include a configurable invocation interval for usage calculator 544 to enable a user or system to define required timeliness of control entity bookkeeping. Each iteration through all of the object metadata reduction of the resulting usage data into total usage values for the control entities by object usage calculator 544 may define a processing time for updating total usage values to provide current values for quota checks. Assuming background iterations were constantly running, the delta between a storage operation that changes usage parameters and the associated usage value being updated for the change would depend on when the storage operation occurred during the iteration, with a worst case of the processing time minus one operation (i.e. assuming that the first data object in the iteration changed or was added immediately after the metadata processing began). Thus, the processing time may be treated as a delay factor in the accuracy of quota determinations. This time may be decreased by limiting update processing to relevant subsets of object data, such as identifying data objects that have been written or modified since the last iteration.

In some embodiments, a configurable delay or scheduling parameter may be applied to determine how often the processing is initiated. For example, a scheduling parameter may run the background task at 3 am daily or every 12 hours. A delay parameter may run the background task 12 hours after the prior process completed. The scheduling parameter plus the processing time may determine the maximum window of uncertainty on the correctness of the quota checks. For example, if the task is triggered every 24 hours and runs for 30 minutes, the maximum time delay between an object write and updating the related control entity total usage value and, thereby, quota status may be 24 hours and 30 minutes. An estimate of the processing time and configurable delay parameter may allow a user or system to set the maximum time delay to an acceptable level for a desired correctness requirement.

Composite quota status 548 may include interfaces, functions, and/or data structures for generating composite quota status values for use in quota status checks 554. For example, quota comparator 538 and/or response generator 542 may generate quota status indicators for each combination of usage parameter and control entity and composite quota status 548 may include logic for reducing the plurality of usage parameter quota status values for each control entity to a single quota status value for each control entity. As a result, access control engine 550 may process quota status check 554 using a single quota status indicator for each control entity involved in a storage access operation. In some embodiments, the composite quota status indicators are written to control entity data 564 and stored in a quota status field associated with a unique control entity identifier or a similar data structure. For example, control entity data 564 may include various data access credentials 564.1 in an access control table or appropriate fields in a control entity table, where credentials 564.1 are used to validate control entity access for object storage operations. Composite quota status values or indicators may be added to the access control table or control entity table or similar data structures for use by access control engine 550.

In example embodiments where the control entities for each operation include accounts, users, and buckets and the usage parameters for checking quotas include count and size, a composite quota status value for each account may include a value corresponding to the count quota status and the size quota status that may be stored in the account record or data structure. A composite quota status value for each user may include a value corresponding to the count quota status and the size quota status that may be stored in the user record or data structure. A composite quota status value for each bucket may include a value corresponding to the count quota status and the size quota status that may be stored in the bucket record or data structure.

Composite quota status 548 may include logic for evaluating the individual parameter quota status values for a control entity and determining the resulting composite quota status. For example, logic may include an "or" operator such that if any of the quotas have been reached (positive for hard quota exceeded), then the resulting composite quota status is positive (access denied for quota threshold exceeded). In some embodiments, quotas may also include multiple response levels and the determination logic of composite quota status 548 may further include evaluation of response levels. For example, some response levels may include access denials and some may not and some response levels may include access denials to different types of operations. In some embodiments, the response levels may be arranged in hierarchy and composite quota status 548 may include logic for taking the highest response level among the response levels associated with the different parameter quota status values and determining a corresponding composite quota status value.

Storage interface 540 may include an interface protocol or set of functions and parameters for storing, reading, and otherwise managing data access requests to an associated object storage system and the corresponding metadata data source. For example, storage interface 540 may include functions for reading, writing, modifying, or otherwise manipulating data objects in object store 570 and their respective client or host data and metadata in accordance with the protocols of an object storage system. In some embodiments, storage interface 540 may include a plurality of hardware and/or software modules configured to use processor 514 and memory 516 to handle or manage defined operations of storage interface 540. For any given client request, storage interface 540 may receive a client request and determine one or more operations, such as an object data access request, based on the content of the request. These operations may include metadata operations handled by a metadata manager and/or object data operations handled by object manager 556. The results of these operations may be processed, formatted, and returned to the client, including notifications, such as data access errors for exceeding one or more quotas and/or related quota warnings.

Storage interface 540 may include one or more object storage configurations that define a storage protocol used for validating, managing, and processing object data requests. For example, object storage configurations may generally define the availability of control entity access for any give object or bucket based on control entity configurator 520, as well as specifying how the object storage system manages data access credentials, validation, and other control entity information. In some embodiments, storage interface 540 may use access control engine 550 for determining control entity access for any given object and generate appropriate response messages in the event of an access denial, such as for a quota threshold exceeded or failure of another data access credential. Object storage configurations may also define what metadata is collected and stored, as well as whether it is stored in a metadata database, such as object metadata 562 in metadata store 560, in object metadata tags stored in the data objects, and/or a combination thereof.

Access control engine 550 may include interfaces, functions, and/or data structures for validating access to data objects in object store 570 based on the access credentials of control entities associated with a particular data storage operation or data access request. For example, access control engine 550 may be called by storage interface 540 when parsing a host storage command to determine whether the related control entities are allowed access to the target data object or objects. In some embodiments, access control engine 550 may execute a system access check 552 for each storage request or operation that may include validating account and/or user access credentials. For example, a storage access request may be accompanied by parameters, metadata, and/or session information defining the account and user sending the command and may validate the received credentials against a set of credentials stored in metadata 560. In some embodiments, these credentials 564.1 may be stored in control entity data 564. Access credentials may include an access or responsibility map between control entities and objects or buckets stored in object store 570. In some embodiments, access credentials may include additional security features, such as passwords, keys, tokens, or similar identify verification parameters.

Access control engine 550 may also include quota status check 554 as an additional access control check. For example, quota status check 554 may use the control entity identifiers associated with the storage access request to validate access based on quota status. In some embodiments, quota status check 554 may read quota status 564.2 for each control entity identifier. If any quota status indicator indicates quota exceeded, then access may be denied and an error message generated, such as "Quota Exceeded" with or without additional parameters to define which quota has been exceeded. In some embodiments, quota status check 554 may validate the quota status using a composite quota status associated with each of the control entities for the request.

Object manager 556 may include interfaces, functions, and/or parameters for reading, writing, and deleting object data elements in object store 570. For example, object PUT commands may be configured to write data objects to object store 570 as part of object write path 558. Object write path 558 may include the methods, operations, or functions related to processing a write request received by storage interface 540 into the storage of a data object or portion thereof in object store 570 or a responsive error message for the write request. Object GET commands may be configured to read data from object store 570 as part of object read path. The object read path may include the methods, operations, or functions related to processing a read request received by storage interface 540 into host data retrieved from object store 570 or a responsive error message for the read request. Object DELETE commands may be configured to delete data from object store 570, or at least mark a data object for deletion until a future garbage collection or similar operation actually deletes the data or reallocates the physical storage location to another purpose. Each of these data access operations may include or be responsive to data access validation, such as data access credentials, permissions, and/or the quota-based data access enforcement described with regard to access control engine 550 above.

In some embodiments, metadata store 560 may be distributed across multiple systems, such as a plurality of control nodes or access systems. Metadata store 560 and/or portions thereof may be sharded data stores, wherein the data stores are partitioned into segments stored in different computing systems. Storage interface 540 and/or object manager 556 may include functions for locating and accessing relevant portions of the sharded data base.

Memory 516 may include additional logic and other resources (not shown) for processing object data requests, such as modules for generating, queueing, validating, and otherwise managing object data requests. Processing of an object data request by storage interface 540 may include any number of intermediate steps that yield at least one data access request to object store 570.

In some embodiments, object store 570 may be logically organized based on the control entities discussed above. For example, the object store may be divided into a plurality of accounts 572. Each of these accounts 572 may contain one or more buckets 574 containing data objects 576. In some embodiments, users may be associated with accounts 572 and buckets 574 to determine access to objects 576.

Figure 6:
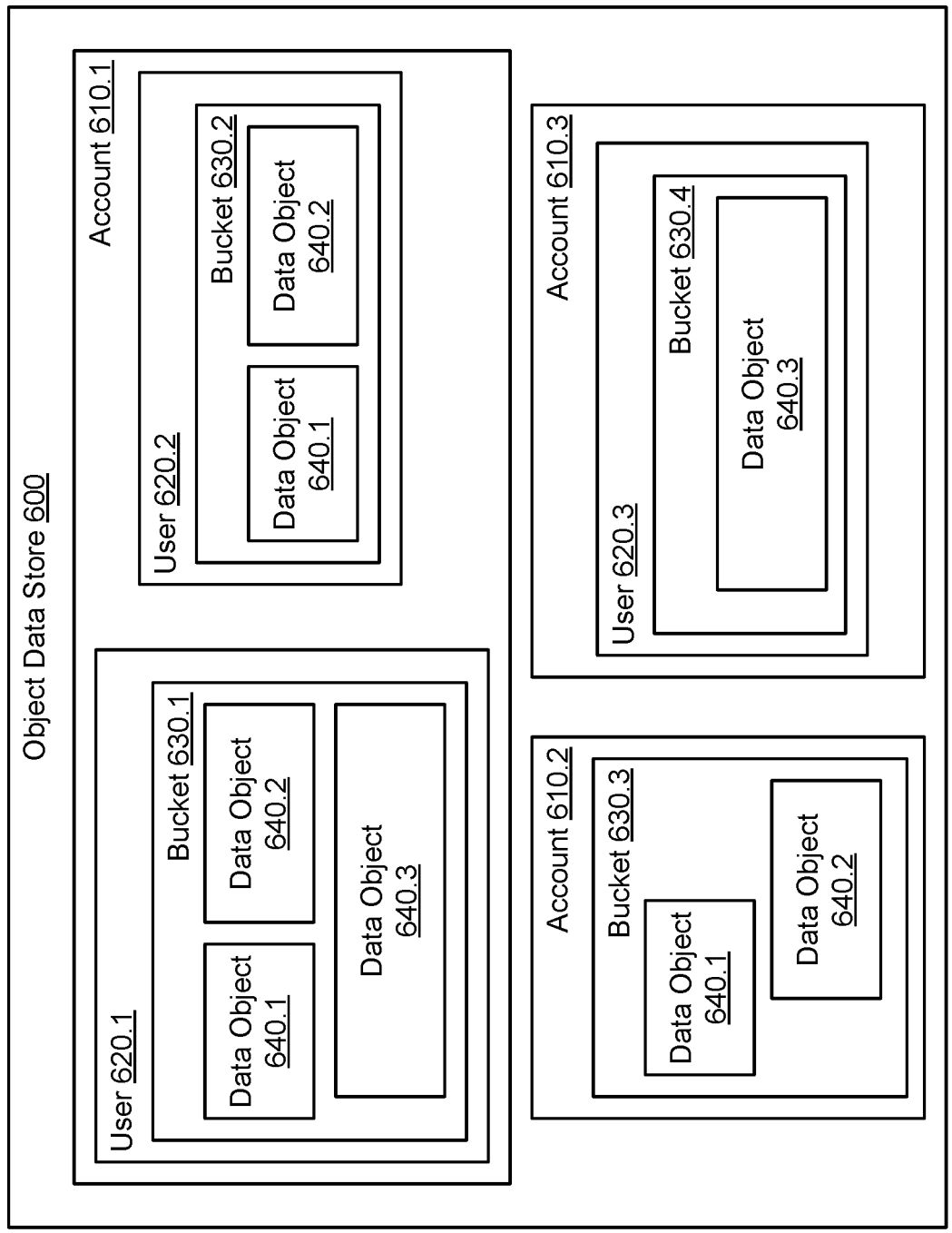
FIG. 6 schematically illustrates an example configuration of an object data store, such as the object data store in FIG. 5.

FIG. 6 shows the logical organization of an example object data store 600. Object data store 600 may show how a plurality of control entities may be associated with various data objects. Object data store 600 includes three accounts 610.1, 610.2, and 610.3. Account 610.2 supports two users 620.1 and 620.2 each of which has access to respective buckets 630.1 and 630.2. Bucket 630.1 includes three data objects 640.1, 640.2, and 640.3 of varying sizes, which are accessible to user 620.1. Bucket 630.2 includes two data objects 640.4 and 640.5, which are accessible to user 620.2. Account 610.2 does not have an associated user. Account credentials may be all that are required to access bucket 630.3. Bucket 630.3 includes two data objects 640.6 and 640.7. Account 610.3 supports a two users 620.3 and 620.4, both of whom have access to the same bucket 630.4. Bucket 630.4 includes one data object 640.8.

If a hard quota threshold for number of data objects is set at 4 and a soft quota threshold for number of data objects is set to 3 for all control entities, write access requests will be denied for account 610.1 and a warning will be issued for user 620.1 and bucket 630.1. Account 610.1 includes 5 data objects, exceeding the hard quota for the number of data objects and user 620.1 is associated with bucket 630.1, which includes 3 data objects. Note that in this case, both users 620.1 and 620.2 and buckets 630.1 and 630.2 will be impacted by the write denial because they are all associated with account 610.1. Accounts 610.2 and 610.3 and their respective buckets (and users) would be unaffected by the quotas so far.

Figure 7:
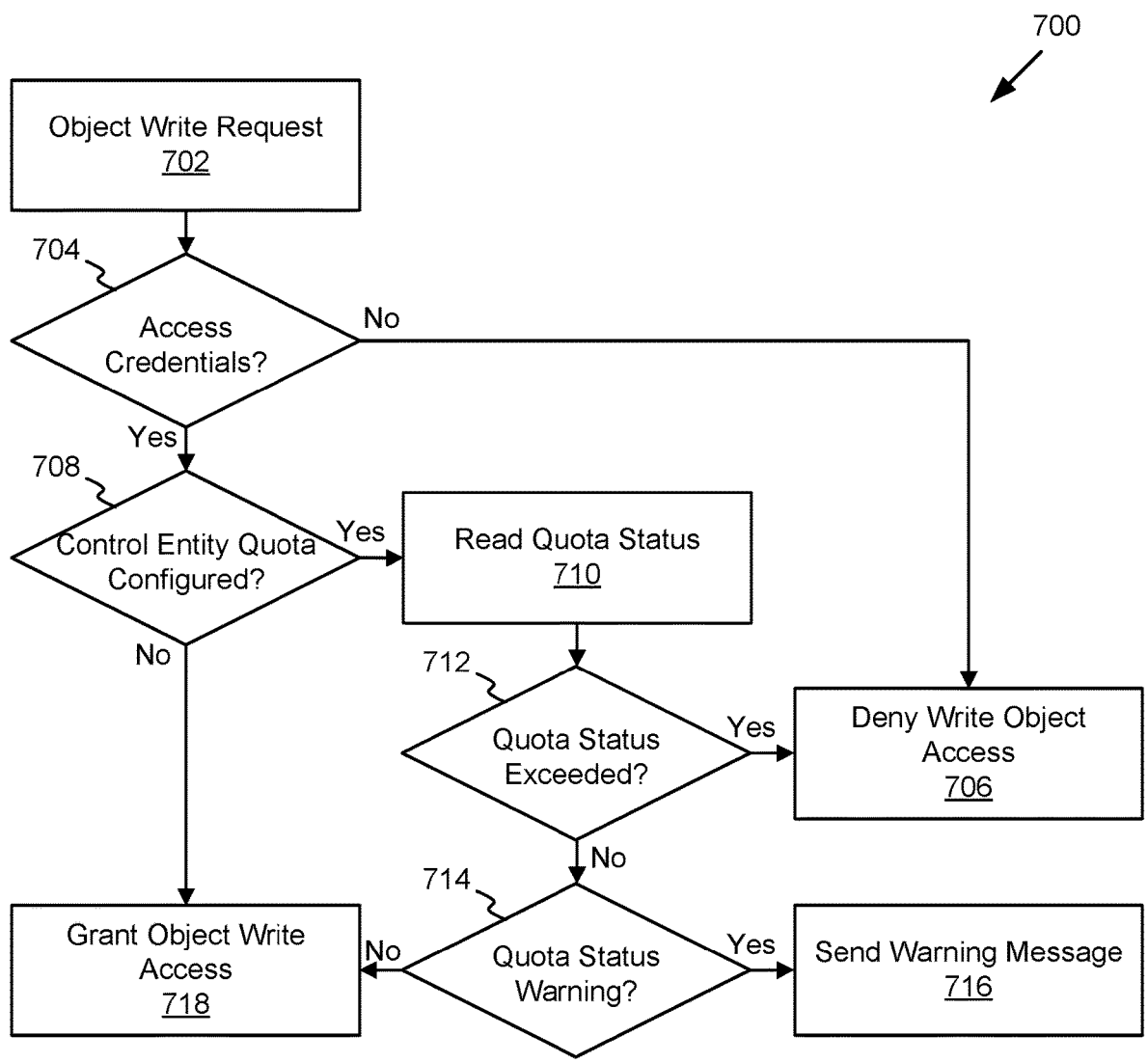
FIG. 7 illustrates an example method for enforcing quotas during data access based on control entities.

As shown in FIG. 7, the object storage system 500 may be operated according to an example method for enforcing control entity quotas through access control, i.e. according to the method 700 illustrated by the blocks 702-718 of FIG. 7. A similar method may be repeated for any number of control entity types (e.g. account, user, and bucket).

When an object storage system is configured for quota enforcement, a new data object access request, such as an object write request, may be received at block 702. For example, a host write request may be received through a storage interface targeting a target data object stored in the object storage system. The object write request may be associated with a plurality of control entities identifiable from the target object. For example, the target data object may be contained in a target bucket that is accessible to a requesting user associated with a requesting account.

At block 704, the system may determine whether one or more control entities have appropriate access credentials. For example, account and user credentials may be included in the data access request or related metadata or session information to validate the identity of the user and both user and account access to the target data object and bucket in the request. If the access credentials cannot be validated, the no condition, method 700 may proceed to block 706 to deny object access. If the access credentials can be validated, the yes condition, method 700 may proceed to block 708.

At block 706, write access to the target data object may be denied based on failure of the access credentials check or the control entity quota check. For example, an error message may be returned to the object write request that specifies that access credentials have not been validated (e.g. unauthorized account or user) or the control entity quota has been exceeded and write access has been denied to enforce this quota. In some embodiments (not shown), method 700 may continue to process the other quota checks in order to identify any other quota thresholds that have been exceeded and provide appropriate response.

At block 708, the system may determine whether a control entity quota has been configured for this request. For example, the object storage system may include a processor configured to determine whether an account hard count quota is set in a control entity configurator, such as control entity configurator 520. If no, the quota check may be skipped and method 700 may proceed to grant object write access at block 718. If yes, method 700 may proceed to block 710.

At block 710, a quota status value for a control entity associated with the target data object may be read. For example, the access control engine may access a quota status value associated with the control entity in a control entity table and process the value to determine further action. At block 712, whether or not the control entity quota threshold has been met (or exceeded) may be determined based on the quota status value. If no, the control entity access quota check may be complete and method 700 may proceed to block 714. If yes, method 700 may proceed to block 706 to deny data object access. If no, method 700 may proceed to block 714. At block 714, whether or not the control entity status indicates another response, such as a quota status warning, may be determined based on the quota status value. If yes, method 700 may proceed to block 718 to send a warning message. If no, method 700 may proceed to block 718. Note that logic for handling any number of different read quota status values and subsequent actions may be included in method 700.

At block 716, a warning message may be sent to a user or other system in response to the warning status being identified from the quota status value. For example, a warning message, such as "X % of quota reached", may be sent to the user or requesting system as part of a response message for the request or as a separate message or other indicator. In some embodiments, generation of various soft quota events may not prevent further quota checks and/or granting of object write access at block 718.

At block 718, object write access or another storage operation may be granted in response to completing one or more quota checks. For example, the write operation responsive to the object write request received at block 702 may be completed by an object manager and an appropriate message returned upon completion.

Figure 8:
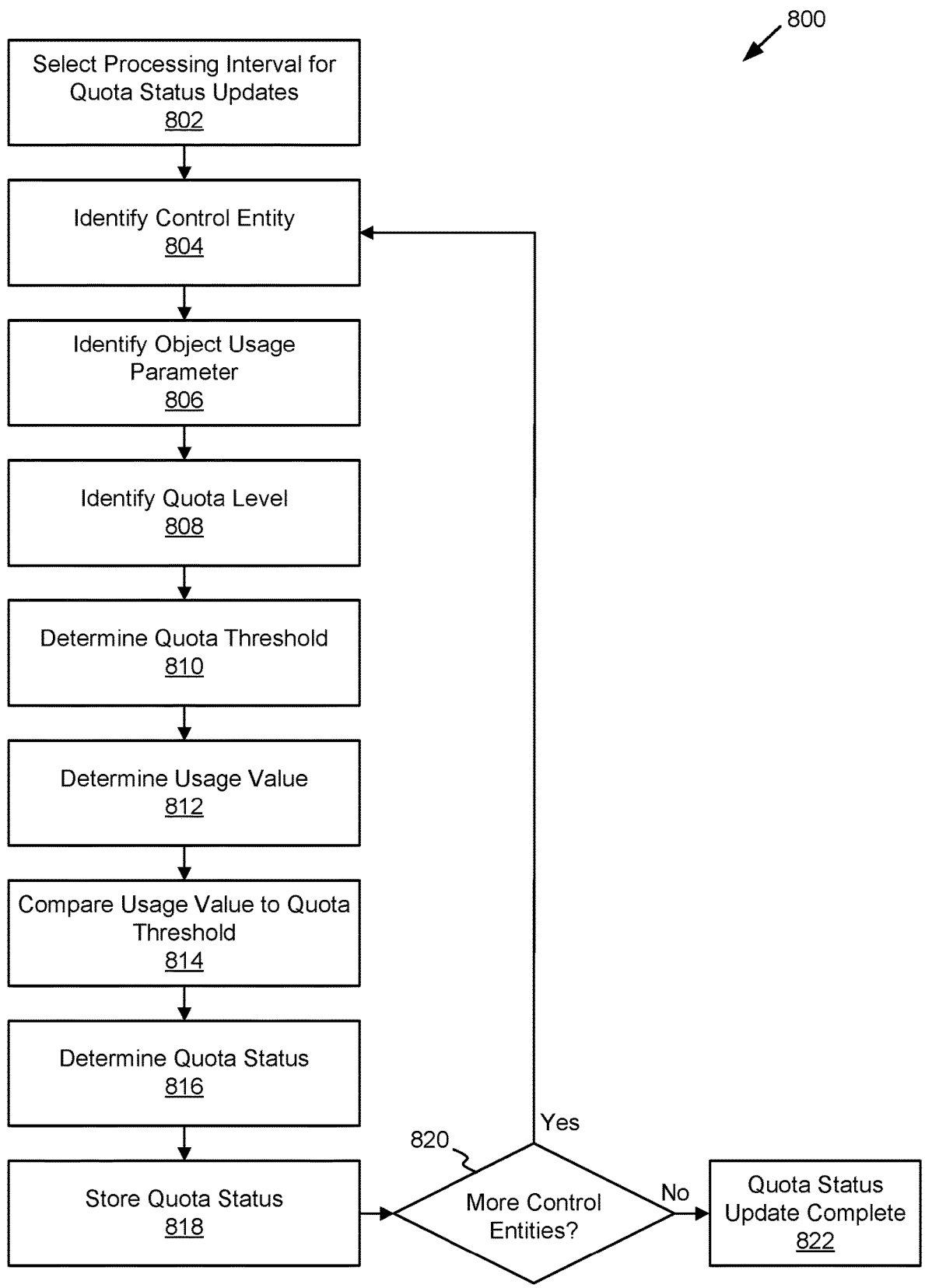
FIG. 8 illustrates an example method for generating quota status for use in data access determinations.

As shown in FIG. 8, the object storage system 500 may be operated according to an example method of iterative quota checks to determine or update quota status values, i.e. according to the method 800 illustrated by the blocks 802-830 of FIG. 8.

At block 802, a processing interval for quota status value updates may be selected. For example, a user or system-configured value may determine how often quota status values are calculated or updated for various control entities, such as every 24 hours.

At block 804, at least one control entity may be identified from all control entities associated with a particular. For example, an object storage command may identify a target data object associated with a specific account, user, and bucket. Each iteration through block 804 may select another control entity.

At block 806, at least one object usage parameter may be identified based on one or more quota thresholds configured for an identified control entity. For example, quota thresholds may be configured for a plurality of object usage parameters, such as total capacity, object size, object count, etc. In some embodiments (not shown), method 800 may iterate through multiple object usage parameters for each control entity. Each iteration through block 806 may select another object usage parameter type for the identified control entity.

At block 808, at least one quota response level may be identified based on quota response levels configured for an identified object usage parameter. For example, quota thresholds may be configured for a plurality of quota response levels, such as hard and soft quota response levels. In some embodiments (not shown), method 800 may iterate through multiple quota response levels for each control entity and object usage parameter. Each iteration through block 808 may select another quota response level for the identified usage parameter type and identified control entity.

At block 810, a quota threshold may be determined. For example, the quota threshold value corresponding to the combination of control entity, object usage parameter, and quota response level may be calculated or retrieved.

At block 812, an object usage value may be determined. For example, the object usage value corresponding to the combination of control entity and object usage parameter may be calculated or retrieved.

At block 814, the object usage value may be compared to the quota threshold value to determine whether the quota threshold is met (or exceeded). For example, a comparator function may determine whether the object usage value exceeds the corresponding quota threshold value.

At block 816, a quota status value may be determined based on the comparison of the usage value to the quota threshold at block 814. For example, if the object usage value exceeds the quota threshold value, the quota status value may be set to indicate a quota exceeded. In some embodiments, quota status may be determined from a plurality of iterations through blocks 806-814 for an identified control entity and the quota status determined at block 816 may be a composite quota status.

At block 818, the quota status value for each control entity may be stored. For example, the quota status value determined at block 816 may be stored to a control entity data structure in a metadata store for use by an access control engine to validate control entity access to target data objects.

At block 820, whether more control entities remain to be checked may be determined. If yes, method 800 may return to identify a next control entity at block 804. If no, method 800 may proceed to block 822.

At block 822, the quota status update may be complete. For example, all control entities and their respective object usage parameters and quota levels may have been checked to determine their quota status value. Method 800 may wait for the selected processing interval to pass before starting another update iteration at block 804.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
an object data store configured to enable a plurality of control entities to access a plurality of data objects associated with at least one control entity of the plurality of control entities;
a bookkeeping engine configured to:
  determine a plurality of quota thresholds associated with each control entity of the plurality of control entities, wherein the plurality of quota thresholds correspond to a plurality of usage quota types;
  determine a plurality of object usage values corresponding to the plurality of quota thresholds for each control entity of the plurality of control entities; and
  determine, based on comparing each object usage value of the plurality of object usage values to the corresponding quota threshold of the plurality of quota thresholds associated with each control entity of the plurality of control entities, a quota status for each usage quota type of the plurality of usage quota types for each control entity of the plurality of control entities; and
an access control engine configured to:
  determine, based on the quota status of each usage quota type associated with at least one requesting control entity from the plurality of control entities, a data object access response for a target data object.

2. The system of claim 1, wherein the plurality of control entities includes control entities selected from:
data object buckets;
user profiles; and
object data store accounts.

3. The system of claim 1, wherein:
the bookkeeping engine is further configured to determine, based on a combination of the quota status of each usage quota type associated with each control entity of the plurality of control entities, a composite quota status value for each control entity of the plurality of control entities; and
the access control engine is configured to use the composite quota status value associated with the at least one requesting control entity to determine the data object access response for the target data object.

4. The system of claim 3, further comprising:
an access control data structure configured to include entries for each control entity of the plurality of control entities, wherein:
  the bookkeeping engine is further configured to add the composite quota status value for each control entity of the plurality of control entities to a corresponding entry for that control entity in the access control data structure; and
  the access control engine is further configured to use the access control data structure to read the composite quota status value for the at least one requesting control entity.

5. The system of claim 1, wherein:
the plurality of quota thresholds associated with the at least one requesting control entity is selected from:
  a number of data objects;
  a storage capacity; or
  a transactional threshold; and
the plurality of object usage values is selected from a corresponding:
  number of data objects value;
  storage capacity value; or
  transactional value.

6. The system of claim 1, wherein:
the bookkeeping engine is further configured to determine the quota status for each of the plurality of control entities asynchronously from write requests to the object data store; and
the access control engine is further configured to respond to each write request to the object data store.

7. The system of claim 1, wherein:
the bookkeeping engine is further configured to store the quota status for each of the plurality of control entities in a metadata store indexed by the plurality of control entities; and
the access control engine is further configured to read the quota status for each of the plurality of control entities from the metadata store indexed by the plurality of control entities.

8. The system of claim 1, wherein the access control engine is further configured to:
determine, based on an access credential associated with at least one requesting control entity from the plurality of control entities, the data object access response for the target data object, the access credential being different than the quota status.

9. The system of claim 8, wherein:
the at least one requesting control entity includes a plurality of requesting control entities associated with a write request to the object data store; and
the access control engine is further configured to execute, for each requesting control entity of the plurality of requesting control entities:
  determining, based on the quota status, the data object access response; and
  determining, based on the access credential, the data object access response.

10. A computer-implemented method, comprising:
  receiving a data object access request associated with a requesting control entity, wherein the requesting control entity is configured to access data objects associated with the requesting control entity;
  determining a plurality of quota thresholds associated with the requesting control entity, wherein the plurality of quota thresholds correspond to a plurality of usage quota types;
  determining a plurality of object usage values corresponding to the plurality of quota thresholds;
  determining, based on comparing each object usage value of the plurality of object usage values to the corresponding quota threshold of the plurality of quota thresholds associated with the requesting control entity, a quota status for each usage quota type of the plurality of usage quota types for the requesting control entity; and
  determining, based on the quota status for each usage quota type associated with the requesting control entity, a data object access response for a target data object.

11. The computer-implemented method of claim 10, wherein:
  the data objects are stored in an object data store;
  the requesting control entity is a control entity from a plurality of control entities associated with the object data store; and
  the plurality of control entities are each associated with at least one data object in the object data store.

12. The computer-implemented method of claim 11, wherein the plurality of control entities includes control entities selected from:
  data object buckets;
  user profiles; and
  object data store accounts.

13. The computer-implemented method of claim 11, further comprising:
  determining, based on a combination of the quota status of each usage quota type associated with each control entity of the plurality of control entities, a composite quota status value for each control entity of the plurality of control entities, wherein determining the data object access response for the data object uses the composite quota status value associated with the requesting control entity.

14. The computer-implemented method of claim 13, further comprising:
  adding the composite quota status value for each control entity of the plurality of control entities to a corresponding entry for that control entity in an access control data structure; and
  reading, responsive to receiving the data object access request, the composite quota status value from the access control data structure for the requesting control entity.

15. The computer-implemented method of claim 11, wherein:
  determining the plurality of object usage values is executed asynchronously from write requests to the object data store; and
  determining the data object access response for the target data object is executed responsive to a write request for the target data object.

16. The computer-implemented method of claim 11, further comprising:
  storing the quota status for each of the plurality of control entities in a metadata store indexed by the plurality of control entities; and
  reading the quota status for each of the plurality of control entities from the metadata store indexed by the plurality of control entities.

17. The computer-implemented method of claim 10, further comprising:
  determining, based on an access credential associated with the requesting control entity, the data object access response for the target data object, wherein the access credential is different than the quota status.

18. The computer-implemented method of claim 17, wherein:
  a plurality of requesting control entities are associated with a write request to the object data store for the target data object; and
  determining the data object access response includes, for each requesting control entity of the plurality of requesting control entities:
    determining, based on the quota status, the data object access response; and
    determining, based on the access credential, the data object access response.

19. A system, comprising:
  an object data store configured to enable a requesting control entity to access data objects associated with the requesting control entity;
  means for determining a plurality of quota thresholds associated with the requesting control entity, wherein the plurality of quota thresholds correspond to a plurality of usage quota types;
  means for determining a plurality of object usage values corresponding to the plurality of quota thresholds;
  means for determining, based on comparing each object usage value of the plurality of object usage values to the corresponding quota threshold of the plurality of quota thresholds associated with the requesting control entity, a quota status for each usage quota type of the plurality of usage quota types for the requesting control entity; and
  means for determining, based on the quota status for each usage quota type associated with the requesting control entity, a data object access response for a target data object.

20. The system of claim 19, wherein:
  the means for determining the plurality of object usage values is configured to execute asynchronously from write requests to the object data store; and
  the means for determining the data object access response for the target data object is configured to execute responsive to a write request for the target data object.

* * * * *